(12) United States Patent
Zhang et al.

(10) Patent No.: US 10,836,906 B2
(45) Date of Patent: Nov. 17, 2020

(54) SILICONE-BASED COMPOSITION AND ARTICLE MADE THEREFROM

(71) Applicant: SAINT-GOBAIN PERFORMANCE PLASTICS CORPORATION, Solon, OH (US)

(72) Inventors: Jianfeng Zhang, Shrewsbury, MA (US); Brian J. Ward, Taunton, MA (US); Michael J. Tzivanis, Chicopee, MA (US); Xipeng Liu, Concord, MA (US); Alban Letailleur, Paris (FR); Jian L. Ding, Glastonbury, CT (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 86 days.

(21) Appl. No.: 15/847,413

(22) Filed: Dec. 19, 2017

(65) Prior Publication Data

US 2018/0171143 A1    Jun. 21, 2018

Related U.S. Application Data

(60) Provisional application No. 62/436,308, filed on Dec. 19, 2016.

(51) Int. Cl.
| | | |
|---|---|---|
| *C08L 83/04* | (2006.01) | |
| *C08K 3/22* | (2006.01) | |
| *G01N 27/416* | (2006.01) | |
| *C08K 5/17* | (2006.01) | |
| *C08K 3/32* | (2006.01) | |

(52) U.S. Cl.
CPC ............... *C08L 83/04* (2013.01); *C08K 3/22* (2013.01); *C08F 2500/17* (2013.01); *C08K 5/17* (2013.01); *C08K 2003/222* (2013.01); *C08K 2003/2206* (2013.01); *C08K 2003/2227* (2013.01); *C08K 2003/2296* (2013.01); *C08K 2003/328* (2013.01); *C08L 2203/02* (2013.01); *G01N 27/4167* (2013.01)

(58) Field of Classification Search
CPC ...... C08L 3/06; C08L 3/04; C08K 3/22; C08J 3/28; C08J 7/18; C08J 7/123
USPC .............................................. 522/72, 99, 148
See application file for complete search history.

(56) References Cited

U.S. PATENT DOCUMENTS

| | | |
|---|---|---|
| 5,378,788 A | 1/1995 | Omura et al. |
| 7,939,614 B2 | 5/2011 | Sueyoshi et al. |
| 8,003,736 B2 | 8/2011 | Sueyoshi et al. |
| 8,637,455 B2 | 1/2014 | Darby et al. |
| 8,772,422 B2 | 7/2014 | Saxena et al. |

(Continued)

FOREIGN PATENT DOCUMENTS

| | | |
|---|---|---|
| EP | 2800790 B1 | 6/2016 |
| JP | 02126857 H | 5/1990 |
| WO | 2003030940 A1 | 4/2003 |

OTHER PUBLICATIONS

International Search Report & Written Opinion for PCT/US2017/067375, dated Apr. 16, 2018, 12 pages.

*Primary Examiner* — Sanza L. McClendon
(74) *Attorney, Agent, or Firm* — Abel Schillinger, LLP; Chi Suk Kim (57) ABSTRACT

A silicone-based composition includes a silicone polymer and at least one acid neutralizer, wherein the silicone-based composition has a pH of at least about 5 after at least one dose of irradiation, when measured by a pH meter.

19 Claims, 3 Drawing Sheets

(56) References Cited

U.S. PATENT DOCUMENTS

| | | |
|---|---|---|
| 9,217,083 B2 | 12/2015 | Hans et al. |
| 9,394,410 B1 | 7/2016 | Bavaro |
| 2005/0079365 A1* | 4/2005 | Widenhouse .......... B05D 3/101 428/447 |
| 2008/0095816 A1 | 4/2008 | Gordy et al. |
| 2008/0166509 A1 | 7/2008 | Simon et al. |
| 2010/0174239 A1 | 7/2010 | Yodfat et al. |
| 2012/0308509 A1 | 12/2012 | Mukhopadhyay et al. |
| 2013/0171265 A1 | 7/2013 | Saxena et al. |

\* cited by examiner

SILICONE-BASED COMPOSITION AND ARTICLE MADE THEREFROM

CROSS-REFERENCE TO RELATED APPLICATION(S)

This application claims priority under 35 U.S.C. § 119(e) to U.S. Patent Application No. 62/436,308, entitled "SILICONE-BASED TUBING AND METHOD FOR MAKING AND USING SAME," by Jianfeng ZHANG et al., filed Dec. 19, 2016, which is assigned to the current assignee hereof and incorporated herein by reference in its entirety.

FIELD OF THE DISCLOSURE

The disclosure, generally, is related to a silicone-based composition and article made from the silicone-based composition.

BACKGROUND

Many industries utilize silicone articles for the delivery and removal of fluids because silicone-based materials are non-toxic, flexible, thermally stable, have low chemical reactivity, and can be produced in a variety of shapes and sizes when compared with articles made from other materials. For example, silicone articles such as tubing may be used in a variety of industries such as the medical industry, pharmaceutical industry, biopharmaceutical industry, and the like.

Gamma radiation may be used for the sterilization of products for biopharmaceutical applications. However, certain issues may arise using conventional silicone-based materials for biopharmaceutical applications.

Accordingly, an improved silicone-based composition and article formed from a silicone-based composition are desired.

SUMMARY

In an embodiment, a silicone-based composition includes a silicone polymer and at least one acid neutralizer, wherein the silicone-based composition has a pH of at least about 5 after at least one dose of irradiation, when measured by a pH meter.

In an embodiment, a silicone-based article includes at least one layer including a silicone-based composition, the silicone-based composition includes a silicone polymer and at least one acid neutralizer, wherein the silicone-based composition has a pH of at least about 5 after at least one dose of irradiation, when measured by a pH meter.

In another embodiment, a method of forming a silicone-based article includes providing at least one layer including a silicone-based composition, the silicone-based composition including a silicone polymer and at least one acid neutralizer; curing the silicone-based composition; and irradiating the silicone-based composition with a radiation source, wherein the silicone-based composition has a pH of at least about 5 after at least one dose of irradiation, when measured by a pH meter.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion focuses on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having" or any other variation thereof, are open-ended terms and should be interpreted to mean "including, but not limited to . . . ." These terms encompass the more restrictive terms "consisting essentially of" and "consisting of." In an embodiment, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts. Unless indicated otherwise, all measurements are at about 25° C. For instance, values for viscosity are at 25° C., unless indicated otherwise.

The disclosure generally relates to a silicone-based composition. The silicone-based composition includes a silicone polymer and at least one acid neutralizer. After exposure to at least one dose of irradiation, the silicone-based composition has a pH of at least 5. The pH is measured by placing a sample of the silicone-based composition in water and measuring the pH of the water via a pH meter. Further details of measuring the pH of the silicone-based composition via a water extraction is discussed in the Examples. In an embodiment, the silicone-based composition is formed into a silicone-based article and in particular, a silicone-based article including at least one layer. In a particular embodiment, the silicone-based article is a tube, such as a biopharmaceutical tube.

In an embodiment, the silicone-based composition includes a silicone polymer. Any reasonable silicone polymer is envisioned. The silicone polymer may, for example, include a polyalkylsiloxane, such as a silicone polymers formed of a precursor, such as dimethylsiloxane, diethylsiloxane, dipropylsiloxane, methylethylsiloxane, methylpropylsiloxane, or combinations thereof. In a particular embodiment, the polyalkylsiloxane includes a polydialkylsiloxane, such as polydimethylsiloxane (PDMS). In a particular embodiment, the polyalkylsiloxane is a silicone hydride-containing polyalkylsiloxane, such as a silicone hydride-containing polydimethylsiloxane. In a further embodiment, the polyalkylsiloxane is a vinyl-containing polyalkylsiloxane, such as a vinyl-containing polydimethylsiloxane. In yet another embodiment, the silicone polymer is a combination of a hydride-containing polyalkylsiloxane and a vinyl-containing polyalkylsiloxane, such as a combination of hydride-containing polydimethylsiloxane and a vinyl-containing polydimethylsiloxane. In an example, the silicone polymer is non-polar and is free of halide functional groups, such as chlorine and fluorine, and of phenyl functional groups. Alternatively, the silicone polymer may include halide functional groups or phenyl functional groups. For example, the silicone polymer may include fluorosilicone or phenylsilicone.

The silicone polymer may further include any reasonable additive, either singly or in combination, such as a catalyst, a vinyl polymer, a hydride, an adhesion promoter, a filler, an initiator, an inhibitor, a colorant, a pigment, a carrier material, or any combination thereof. In an embodiment, the silicone polymer includes any reasonable catalyst depending on the silicone polymer. For instance, an exemplary catalyst is a peroxide, an organometallic complex compound of a transition metal, or combination thereof. In an embodiment, the catalyst includes platinum, rhodium, ruthenium, the like, or combinations thereof. In an embodiment, the catalyst is platinum-based. In an embodiment, any reasonable filler may be included in the silicone polymer. For instance, the filler includes, for example, fumed silica. In an embodiment, an inhibitor may be included such as ethynyl cyclohexanol.

In an embodiment, the silicone polymer has a viscosity prior to cure of up to about 100,000,000 centipoise (cPs). In an embodiment, the silicone polymer has a viscosity prior to cure of at least about 10,000 centipoise, such as at least about 1,000,000 centipoise, such as at least about 2,000,000 centipoise. In an embodiment, the viscosity of the silicone polymer prior to cure is about 10,000 centipoise to about 100,000,000 cPs, such as about 50,000 centipoise to about 100,000,000 cPs, such as about 50,000 cPs to about 5,000,000 cPs. In a particular embodiment, the silicone polymer includes a liquid silicone rubber (LSR), a high consistency gum rubber (HCR), a room temperature vulcanizing silicone (RTV), or combination thereof. In an embodiment, the liquid silicone rubber typically has a viscosity prior to cure of less than about 2,000,000 cPs, such as about 10,000 cPs to about 2,000,000 cPs, such as about 50,000 cPs to about 2,000,000 cPs, such as about 200,000 cPs to about 1,000,000 cPs, such as about 500,000 cPs to about 800,000 cPs. In an embodiment, the high consistency gum rubber typically has a viscosity prior to cure of greater than about 2,000,000 cPs, such as about 2,000,000 cPs to about 100,000,000 cPs, such as about 2,000,000 cPs to about 50,000,000 cPs. In a particular embodiment, the silicone polymer is a high consistency gum rubber. Viscosity for the silicone polymer is measured via a steady shear rate sweep with data reported for 1 l/s (sec$^{-1}$). It will be appreciated that the viscosity of the silicone polymer can be between any of the minimum and maximum values noted above.

In a particular embodiment, the silicone-based composition may include a conventional, commercially prepared silicone polymer such as a radiation cured or a heat cured silicone polymer. In a particular embodiment, the conventional, commercially prepared silicone polymer is a conventional heat cured silicone polymer. "Conventional heat cure" as used herein refers to curing via heat at a temperature greater than about 150° C. The commercially prepared silicone polymer typically includes components such as the non-polar silicone polymer, the catalyst, a filler, and optional additives. Any reasonable filler and additives are envisioned. In an embodiment, the silicone-based composition is substantially free of additives. "Substantially free" as used herein refers to less than about 0.1% by weight of any additive, based on the total weight of the silicone-based composition. Commercially available silicone polymers include, for example, a high consistency gum rubber (HCR), a liquid silicone rubber (LSR), or a room temperature vulcanizing silicone (RTV). In an embodiment, the silicone polymer has been validated for regulatory approval by the food and drug administration (FDA), United Stated Pharmacopeia (USP), European Pharmacopeia (EP), International Standards Organization (ISO), other regulatory approvals, or combination thereof. For instance, the silicone polymer has been validated using a USP Class VI standard, ISO 10993 standard, and the like.

The silicone-based composition further includes at least one acid neutralizer. Any reasonable acid neutralizer is envisioned to neutralize the acidic species such that an acceptable pH is obtained for the silicone-based composition after exposed to at least one dose of irradiation. In an embodiment, the acid neutralizer includes a metal oxide, a salt of a strong base and a weak acid, a weak base, a hydroxide, an organic base, an ion exchanger, or combination thereof. In a particular embodiment, the acid neutralizer is a metal oxide. Any reasonable metal oxide is envisioned. In an embodiment, the metal oxide includes, for example, an alkali earth metal, a transition metal, or combination thereof. In a more particular embodiment, the metal oxide is calcium oxide, magnesium oxide, zinc oxide, cerium oxide, or combination thereof. The metal oxide may be chosen with a desirable solubility in water. In an embodiment, a corresponding hydroxide of the metal oxide has a desirable pKb such as not greater than about 14, such as not greater than 11, such as not greater than 7, such as not greater than 4, or even not greater than 0. In an embodiment, the acid neutralizer is chosen to create a strong base/weak acid combination in solution. In a particular embodiment, a strong base/weak acid in solution may be formed by the use of a weak base such as a carbonate, a phosphate, an acetate, and the like. The salt of a strong base and a weak acid are exemplified by a metal carbonate, a metal phosphate, and the like. In an embodiment, the acid neutralizer is a hydroxide, such as an insoluble hydroxide. In a particular embodiment, the acid neutralizer hydroxide includes a metal hydroxide such as, for example, $Ca(OH)_2$, $Mg(OH)_2$, $Zn(OH)_2$, $Al(OH)_3$, and the like, or combination thereof. In an embodiment, the acid neutralizer is a $Mg(OH)_2$, $Zn(OH)_2$, or combination thereof. In an embodiment, the organic base includes, for example, an organic amine. In an embodiment, the ion exchanger is an inorganic ion exchanger, such as a cation exchanger. In a particular embodiment, the ion exchanger includes zirconium phosphate (ZrP). Any combination of the acid neutralizer may be used to provide the desired result. In an embodiment, at least two acid neutralizers may be used with different speeds of dissolution.

The inclusion of the acid neutralizer in the silicone-based composition provides an unexpected result with the pH of the silicone-based composition after it is exposed to at least one dose of irradiation. It was unexpectedly discovered that after sterilization with at least one dose of irradiation, acidic species are formed, which could be potentially harmful when a fluid is in contact with the silicone-based composition. For instance, after gamma irradiation, the pH of the silicone-based composition after exposure to water is less than 5 for a silicone-based composition including a silicone polymer without an acid neutralizer. However, it was discovered that with the inclusion of at least one acid neutralizer with the silicone polymer would increase the pH of the silicone-based composition to at least about 5, such as at least about 6 after at least one dose of irradiation, when measured by a pH meter. In an embodiment, the silicone-based composition that includes of at least one acid neutralizer with the silicone polymer would increase the pH of the silicone-based tube to about 5 to about 10, such as about 5 to about 8 after at least one dose of irradiation, when measured by a pH meter. It will be appreciated that the pH of the silicone-based composition can be between any of the minimum and maximum values noted above.

Any reasonable amount of acid neutralizer is envisioned to increase the pH of the resulting gamma irradiated silicone-based composition. In an embodiment, the acid neutralizer is present at an amount of about 0.0001% by weight to about 3.0% by weight, such as about 0.0001% by weight to about 2.0% by weight, such as about 0.0001% by weight to about 1.0% by weight, such as about 0.001% by weight to about 1.0% by weight, or even about 0.001% by weight to about 0.1% by weight, based on the total weight of the silicone-based composition. In an embodiment, the acid neutralizer is a metal oxide present at an amount of about 0.0001% by weight to about 3.0% by weight, such as about 0.0001% by weight to about 2.0% by weight, such as about 0.0001% by weight to about 1.0% by weight, such as about 0.001% by weight to about 1.0% by weight, or even about 0.001% by weight to about 0.1% by weight, based on the total weight of the silicone-based composition. It will be appreciated that the amount of the acid neutralizer can be between any of the minimum and maximum values noted above.

In an embodiment, the polymer material content of the silicone-based composition is essentially 100% silicone polymer. In some embodiments, the silicone-based composition consists essentially of the respective silicone polymer and acid neutralizer described above. As used herein, the phrase "consists essentially of" used in connection with the silicone polymer and acid neutralizer precludes the presence of non-silicone polymers that affect the basic and novel characteristics of the silicone polymer, although, commonly used processing agents and additives may be used in the silicone polymer.

Figure 1:
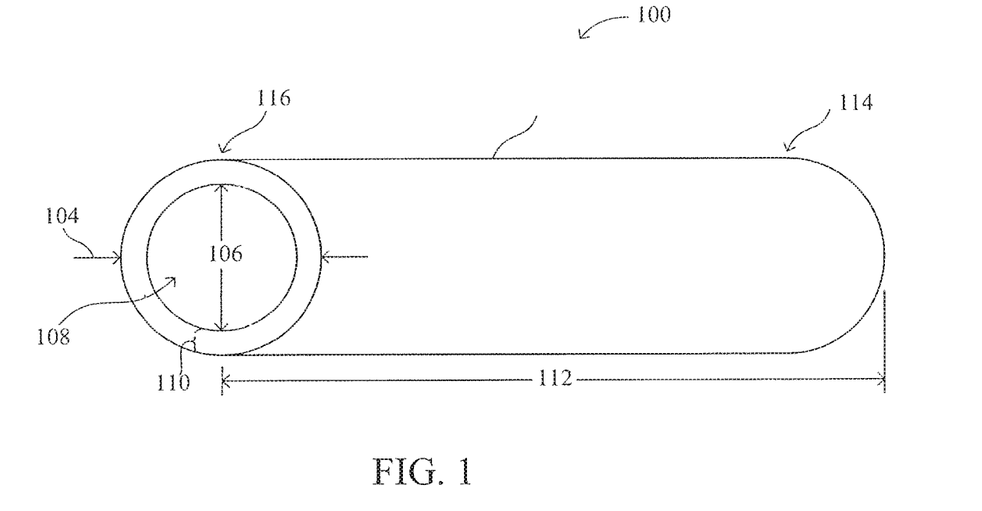
FIG. 1 includes an illustration of an exemplary silicone-based tube.

As illustrated in FIG. 1, the silicone-based composition is a silicone-based tube 100 that includes a body 102 having an outer diameter 104 and an inner diameter 106. The inner diameter 106 can form a hollow bore 108 of the body 102. The inner diameter 106 provides an inner surface that defines a central lumen of the silicone-based tube 100. In addition, the body 102 can include a wall thickness 110 that is measured by the difference between the outer diameter 104 and the inner diameter 106. Further, the body 102 can have a length 112. Any dimensions of the silicone-based tube are envisioned. For instance, any thickness of the layer is envisioned and is typically dependent upon the final properties desired for the silicone-based tube.

In a particular embodiment, the outer diameter 104 can be any reasonable outside diameter envisioned for a silicone-based tube. In a more particular embodiment, the outside diameter is dependent upon the application and the final properties desired. For instance, the outside diameter can be at least approximately 0.050 inch, at least approximately 0.125 inch, at least approximately 0.25 inch, at least approximately 0.5 inch, or at least approximately 1.5 inch. Any reasonable upper limit is envisioned. It will be appreciated that the outer diameter 104 can be within a range below the minimum value noted above.

In another embodiment, the inner diameter 106 of the body 102 can be any reasonable inner diameter envisioned for a silicone-based tube. In a more particular embodiment, the inner diameter is dependent upon the application and the final properties desired. For instance, the inner diameter can be at least approximately 0.025 inch, such as at least approximately 0.060 inch, at least approximately 0.125 inch, at least approximately 0.5 inch, or at least approximately 1.0 inch. Any reasonable upper limit is envisioned. It will be appreciated that the inner diameter 106 can be within a range below the minimum value noted above.

In a further embodiment, the length 112 of the body 102 can be at least approximately 1 centimeter, at least approximately 10 centimeters, at least approximately 50 centimeters, or even at least approximately 2 meters (m), at least about 5 meters, at least about 10 meters, at least about 20 meters, at least about 30 meters, at least about 50 meters, or even about 100 meters. The length 112 is generally limited by pragmatic concerns, such as storing and transporting lengths, or by customer demand. Any reasonable upper limit is envisioned. It will be appreciated that the length 112 can be within a range below the minimum value noted above.

Although the cross-section of the inner bore 108 perpendicular to an axial direction of the body 102 in the illustrative embodiment shown in FIG. 1 has a circular shape, the cross-section of the inner bore 108 perpendicular to the axial direction of the body 102 can have a square shape, a triangular shape, or a rectangular shape.

Although illustrated as one layer, any number of layers is envisioned. For instance, the silicone-based tube may include at least two layers, or even a greater number of layers. The number of layers is dependent upon the final properties desired for the silicone-based tube. For instance, the silicone-based tube may further include other layers. Other layers include, for example, a polymeric layer, a reinforcing layer, an adhesive layer, a barrier layer, a chemically resistant layer, a metal layer, any combination thereof, and the like. Any reasonable method of providing any additional layer is envisioned and is dependent upon the material chosen. Any thickness of the other layers may be envisioned. In an embodiment, the silicone-based tube consists essentially of the at least one layer including the silicone-based composition as described.

In an embodiment, the silicone-based composition may be formed by any reasonable means depending upon the final article desired. In an example, an at least one silicone layer is provided by any reasonable means. In an embodiment, the at least one silicone layer is formed by extrusion or injection molding followed by thermal cure, radiation cure, or combination thereof.

In an exemplary embodiment, the at least one silicone layer is formed by an extrusion system. The method includes receiving, by an extrusion system, the silicone-based composition as described above. The extrusion system for the at least one silicone layer typically includes a pumping system and can include a number of devices that can be utilized to form the at least one silicone layer of the silicone-based tube. For example, the extrusion system can include a pumping device such as a gear pump, a static mixer, an extruder, a tube die, a thermal cure device, a radiation cure device, a post-processing device, or any combination thereof. Typically, the silicone-based composition is mixed and pumped, i.e. extruded, through a tube die of the extrusion system. Any reasonable mixing apparatus is envisioned. In a particular embodiment, the mixing apparatus forms a homogenous mixture of the silicone polymer and the acid neutralizer, such as a metal oxide. In an embodiment, heat may also be applied to the silicone-based composition. For instance, any reasonable heating temperature for the components of the silicone-based composition may be used to provide a material that can flow from the pumping system and extruded through the die without degradation of the material. For instance, the temperature may be about 10° C. to about 70° C. It will be appreciated that the heating temperature can be within a range between any of the minimum and maximum values noted above.

In an alternative embodiment, the at least one silicone layer is formed by an injection molding system. The injection molding system includes any pumping system to deliver the silicone-based composition such as pneumatically, hydraulically, gravitationally, mechanically, and the like, or combination thereof. The pumping system delivers the silicone-based composition to a mold configured in any shape desired for the final article, such as a tube. The pumping system may also include any reasonable mixing apparatus envisioned. In a particular embodiment, the mixing apparatus forms a homogenous mixture of the silicone polymer and the acid neutralizer, such as a metal oxide. Further, the pumping system may include a method of heating any combination of the components of the silicone-based composition to any temperature envisioned so that it has a desirable viscosity for delivery such that the silicone-based composition may flow into the mold. The injection molding system may further include a thermal cure device, a radiation cure device, a post-processing device, or any combination thereof.

In an embodiment, the silicone-based composition is thermally cured. In an embodiment, the thermal curing of the silicone-based composition can include subjecting the silicone-based composition to one or more heat sources. In a particular embodiment, the heat source is sufficient to substantially cure the silicone-based composition. "Substantially cure" as used herein refers to >90% of final crosslinking density, as determined for instance by rheometer data (90% cure means the material reaches 90% of the maximum torque as measured by ASTM D5289). For instance, the level of cure is to provide a desirable durometer for the final silicone-based article. In an embodiment, the final durometer of the silicone-based article depends on the material chosen for the silicone-based composition.

In an embodiment, the silicone-based composition is radiation cured. Any number of applications of radiation energy may be applied with the same or different wavelengths. For example, the extrusion system or injection molding system can include one or more ovens (e.g. infrared (IR) ovens, air ovens), one or more baths (e.g. water baths), or a combination thereof, to cure the silicone-based composition. The one or more IR ovens can operate at a particular peak wavelength. In certain instances, the peak wavelength of a first IR oven can be different from the peak wavelength of a second IR oven. In an embodiment, the silicone-based composition can be subjected to a heat treatment for a specified period of time. In a particular embodiment, the silicone-based composition can be subjected to curing in a first IR oven for a first period of time and then subject to curing in a second IR oven for a second period of time that is different from the first period of time. In one particular embodiment, use is made of a short wavelength IR oven. By short wavelength, it is meant that the peak wavelength is below 4 microns, typically below 3 microns, such as within a range of approximately 0.6 to 2.0 microns, such as 0.8 to 1.8 microns. Generally medium and longer wavelength IR ovens are characterized by a peak wavelength on the order of 4 to 8 microns, or even higher. It will be appreciated that the wavelength can be within a range between any of the minimum and maximum values noted above.

Once the silicone-based composition is formed, the silicone-based composition can undergo one or more post processing operations. Any reasonable post processing operations are envisioned. For instance, the silicone-based composition can be subjected to any reasonable radiation source such as UV radiation, e-beam radiation, gamma radiation, and the like. In a particular embodiment, the silicone-based article, such as a tube, is sterilized via gamma radiation. Any gamma radiation source and dosage is envisioned to sterilize the composition. In an embodiment, the silicone-based composition is sterilized via Cobalt-60 ($^{60}$Co) at a dose of about 10 kGy to about 200 kGy, such as about 20 kGy to about 100 kGy, such as about 25 kGy to about 100 kGy, such as about 50 kGy to about 100 kGy. It will be appreciated that the radiation dose can be within a range between any of the minimum and maximum values noted above.

Further, the silicone-based composition can be subjected to a post-cure heat treatment, such as a post-curing cycle. Post thermal treatment typically occurs at a temperature of about 40° C. to about 200° C. In an embodiment, the post thermal treatment is at a temperature of about 60° C. to about 100° C. Typically, the post thermal treatment occurs for a time period of about 5 minutes to about 10 hours, such as about 10 minutes to about 30 minutes, or alternatively about 1 hour to about 4 hours. It will be appreciated that the post thermal treatment temperature and time can be within a range between any of the minimum and maximum values noted above. In an alternative example, the silicone-based composition is not subjected to a post thermal treatment. In an example, the silicone-based article is a tube that can be cut into a number of silicone-based tubes having a specified length. In another embodiment, the post processing can include wrapping the silicone-based tube into a coil of tubing.

Once formed and cured, particular embodiments of the above-disclosed process advantageously exhibit desired properties such as a pH of greater than 5 after gamma irradiation. Although not being bound by theory, it is believed that the gamma irradiation results in the formation of acidic species within the silicone-based composition. The acid neutralizer, such as a metal oxide, within the silicone-based composition at least acts to neutralize the acidic species such that an acceptable pH is obtained. As discussed above, the silicone-based composition has a pH of at least about 5, such as at least about 5 to about 10, such as about 5 to about 8 after at least one dose of irradiation.

Once formed and cured, particular embodiments of the above-disclosed silicone-based composition advantageously exhibit desired properties such as flexibility, chemical resistance, wettability, biocompatibility, low extractables, pump performance such as flow rate, stability, pump life, and the like. In particular, the silicone-based tube has at least comparable, if not improved, properties compared to a traditional silicone article, such as a traditional silicone tube, consisting of a silicone material without an acid neutralizer. In an embodiment, the silicone-based composition has a desirable flexibility, as indicated by a shore A durometer between about 20 to about 90, such as about 20 to about 60.

Many industries utilize silicone-based articles in conjunction with an apparatus for the delivery and removal of fluids. Applications are numerous for silicone-based articles such as tubing where, for example, pump performance, pump flow rate, pump life, and stability are desired. Silicone-based tubing may be used in conjunction with any reasonable apparatus. An exemplary apparatus is a medical device, a pharmaceutical device, a biopharmaceutical device, a chemical delivery device, a laboratory device, a water treatment device, a document printing device, a food and beverage device, an industrial cleaning device, an automotive device, an aerospace device, an electronics device, or a fuel delivery device. In an embodiment, the apparatus is a single-use system. In an embodiment, the apparatus is includes a pump coupled to the tube to dispense fluid contained within the silicone-based tube. In a more particular embodiment, the pump is a portion of a biopharmaceutical device. Further, the pump may be a peristaltic pump. In an embodiment, the medical device is a feeding device, a drug delivery device, or a chemical delivery device. Further, although described primarily as a silicone-based tube, such as a biopharmaceutical tube, any article, profile, or film is envisioned containing at least one silicone layer. For instance, the silicone-based composition is formed into at least a portion of an article such as a tube, a manifold, a seal, a gasket, a stopper, and the like. In an embodiment, the article, profile, or film may be formed by any reasonable means such as extrusion, molding, lamination, calendaring, casting, and the like.

Figure 2:
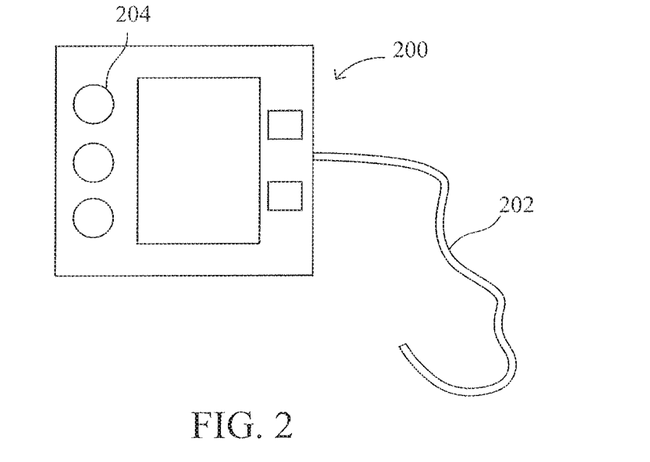
FIG. 2 is a diagram of an apparatus coupled to a silicone-based tube according to an embodiment.

FIG. 2 is a diagram of an apparatus 200 coupled to a silicone-based tube 202 according to an embodiment. The silicone-based tube 202 can be formed from the silicone-based tube 100 of FIG. 1. In an embodiment, the apparatus 200 is a biopharmaceutical device used to provide the fluid.

In an embodiment, the apparatus 200 can include a pump to dispense fluid via the silicone-based tube 202. In an embodiment, the apparatus 200 can include a peristaltic pump, an infusion pump, an enteral feeding pump, or a combination thereof.

The silicone-based tube can contribute to providing a specified amount of fluid. For example, one or more controls, such as the control 204, can be set to provide a specified flow rate of fluid. An amount of fluid can be dispensed that is within a particular tolerance in relation to the amount specified via the control 204.

In an exemplary embodiment, the silicone-based tube has a desirable flow stability and increased lifetime. In an embodiment, the silicone-based tube may have a pump life of greater than about 100 hours, such as greater than about 200 hours, or even greater than about 400 hours as measured by peristaltic pumping at 400 rpm and 0 psi backpressure.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1

A silicone-based composition includes a silicone polymer and at least one acid neutralizer, wherein the silicone-based composition has a pH of at least about 5 after at least one dose of irradiation, when measured by a pH meter.

Embodiment 2

A silicone-based article includes at least one layer including a silicone-based composition, the silicone-based composition includes a silicone polymer and at least one acid neutralizer, wherein the silicone-based composition has a pH of at least about 5 after at least one dose of irradiation, when measured by a pH meter.

Embodiment 3

A method of forming a silicone-based article includes providing at least one layer including a silicone-based composition, the silicone-based composition including a silicone polymer and at least one acid neutralizer; curing the silicone-based composition; and irradiating the silicone-based composition with a radiation source, wherein the silicone-based composition has a pH of at least about 5 after at least one dose of irradiation, when measured by a pH meter.

Embodiment 4

The silicone-based composition, the silicone-based article, or the method of forming the silicone-based article of embodiments 1, 2, or 3, wherein the silicone polymer includes a polyalkylsiloxane.

Embodiment 5

The silicone-based composition, the silicone-based article, or the method of forming the silicone-based article of embodiment 4, wherein the polyalkylsiloxane has a viscosity prior to cure of at least about 10,000 centipoise, such as at least about 1,000,000 centipoise, such as at least about 2,000,000 centipoise at a shear rate of 1 l/s ($sec^{-1}$).

Embodiment 6

The silicone-based composition, the silicone-based article, or the method of forming the silicone-based article of embodiment 5, wherein the silicone polymer includes a high consistency gum rubber (HCR).

Embodiment 7

The silicone-based composition, the silicone-based article, or the method of forming the silicone-based article of embodiments 1, 2, or 3, wherein the silicone-based composition includes a catalyst.

Embodiment 8

The silicone-based composition, the silicone-based article, or the method of forming the silicone-based article of embodiment 7, wherein the catalyst is platinum.

Embodiment 9

The silicone-based composition, the silicone-based article, or the method of forming the silicone-based article of embodiments 1, 2, or 3, wherein the acid neutralizer includes a metal oxide, a salt of a strong base and a weak acid, a weak base, a hydroxide, an organic base, an ion exchanger, or combination thereof.

Embodiment 10

The silicone-based composition, the silicone-based article, or the method of forming the silicone-based article of embodiment 9, wherein the metal oxide includes an alkaline earth metal, a transition metal, or combination thereof.

Embodiment 11

The silicone-based composition, the silicone-based article, or the method of forming the silicone-based article of embodiment 10, wherein the metal oxide includes magnesium oxide, calcium oxide, zinc oxide, or combination thereof.

Embodiment 12

The silicone-based composition, the silicone-based article, or the method of forming the silicone-based article of embodiment 9, wherein a corresponding hydroxide of the metal oxide has a pKb of not greater than about 14, such as not greater than 11, such as not greater than 7, such as not greater than 4, or even not greater than 0.

Embodiment 13

The silicone-based composition, the silicone-based article, or the method of forming the silicone-based article of embodiment 9, wherein the metal oxide is present at an amount of about 0.0001% by weight to about 1.0% by weight, such as about 0.001% by weight to about 1.0% by weight, or even about 0.001% by weight to about 0.1% by weight, based on the total weight of the silicone-based composition.

Embodiment 14

The silicone-based composition, the silicone-based article, or the method of forming the silicone-based article of embodiments 1, 2, or 3, wherein the silicone-based composition further includes a filler, a fluorosilicone, a phenylsilicone, an inhibitor, or a combination thereof.

Embodiment 15

The silicone-based composition, the silicone-based article, or the method of forming the silicone-based article of embodiments 1, 2, or 3, wherein the silicone-based composition has a pH of about 5 to about 10, such as about 5 to about 8 after at least one dose of irradiation, when measured by a pH meter.

Embodiment 16

The silicone-based composition, the silicone-based article, or the method of forming the silicone-based article of embodiments 1, 2, or 3, wherein the does of irradiation includes gamma irradiation of Cobalt-60 ($^{60}$Co) at a dose of about 10 kGy to about 200 kGy, such as about 25 kGy to about 100 kGy.

Embodiment 17

The silicone-based composition, the silicone-based article, or the method of forming the silicone-based article of embodiments 1, 2, or 3, wherein the dose of irradiation substantially sterilizes the silicone-based composition.

Embodiment 18

The silicone-based composition, the silicone-based article, or the method of forming the silicone-based article of embodiments 1, 2, or 3, wherein the silicone-based composition is at least a portion of a tubing, a manifold, a seal, a gasket, or a stopper.

Embodiment 19

The silicone-based composition, the silicone-based article, or the method of forming the silicone-based article of embodiments 1, 2, or 3, wherein the silicone-based composition is a biopharmaceutical tube.

Embodiment 20

The silicone-based article or the method of forming the silicone-based article of embodiments 2 or 3, wherein the at least one layer including the silicone-based composition has an inner surface that defines a central lumen of a silicone-based tube.

Embodiment 21

The silicone-based article, or the method of forming the silicone-based article of embodiment 20, wherein the inner surface is in contact with a biopharmaceutical fluid.

Embodiment 22

The method of forming the silicone-based article of embodiment 3, wherein providing the silicone-based composition includes extruding or injection molding.

Embodiment 23

The method of forming the silicone-based article of embodiment 3, wherein curing the silicone-based composition includes thermal cure, radiation cure, or combination thereof.

Embodiment 24

An apparatus including: the silicone-based article according to claim 2, wherein the silicone-based article includes a tube; and a pump coupled to the tube to dispense fluid contained in the tube.

Embodiment 25

The apparatus of embodiment 24, wherein the apparatus is a single-use system.

Embodiment 26

The apparatus of embodiment 24, wherein the pump includes a biopharmaceutical device to provide the fluid.

Embodiment 27

The apparatus of embodiments 24-26, wherein the pump is a peristaltic pump.

Embodiment 28

A medical device including the silicone-based article according to embodiment 2.

Embodiment 29

The medical device of embodiment 28, wherein the medical device is a feeding device, a drug delivery device, or a chemical delivery device.

The concepts described herein will be further described in the following examples, which do not limit the scope of the disclosure described in the claims. The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

Example 1

The water extract of silicone tubing of a platinum catalyzed high consistency gum rubber (HCR) with a shore A hardness of 50 durometer that is not exposed to gamma radiation shows a pH of 6.17, while the water extract of same lot silicone tubing after gamma radiation of Cobalt-60 ($^{60}Co$) at a dose of about 50 kGy shows a pH of 3.23. The extraction method is as follows: a volume of 250 ml water is filled into and contacted with 790 cm silicone tubing (ID/OD: ¼"×⅜"), at 70° C. for 24 hours. The extract solution is measured for pH via a pH meter giving a value for the silicone-based tube. Notably, the pH is standardized to a surface to volume ratio of 6.3 $cm^2/mL$ (centimeter-squared per milliliter).

Buffering Capacity Analyses are performed on the silicone tubing with and without gamma radiation. Buffering Capacity Analyses are as follows: 0.010 N Sodium Hydroxide solutions are made by dissolving 0.2 g Sodium Hydroxide into 500 ml Water. A volume of 20 ml blanks and test sample extracts are titrated by 0.010 N Sodium Hydroxide solutions, respectively as per internal procedure.

As seen in Table 1, it takes about 0.10 ml of NaOH solution (0.010N) to titrate to pH 7.11 for no-gamma silicone tubing, while it takes about 5.10 ml NaOH to titrate to pH 7.49 for the after gamma silicone tubing. Accordingly, it is surmised that the gamma radiation of the silicone tubing forms acidic moieties and as such, lowers the pH of the water extract from 6.17 to 3.23.

TABLE 1

| Extraction | | Buffering Capacity | | |
| --- | --- | --- | --- | --- |
| Sample | Treatment method | pH before titration | pH after titration | Volume of used NaOH (ml) |
| Silicone tubing 50 Duro | No gamma | 6.17 | 7.11 | 0.10 |
| Silicone tubing 50 Duro | Gamma | 3.23 | 7.49 | 5.10 |

Example 2

Figure 3:
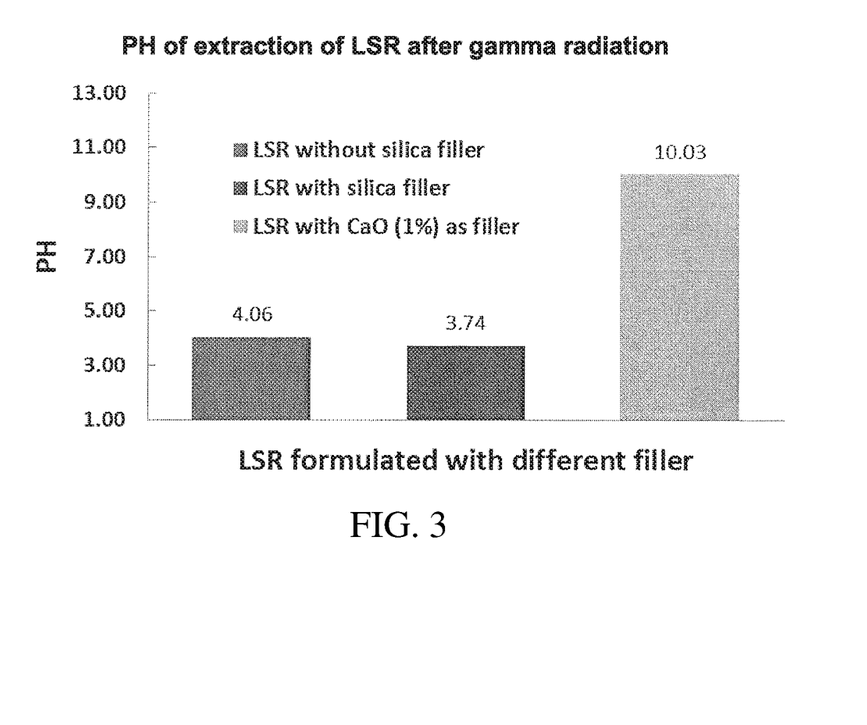
FIG. 3 is a graphical illustration of the pH of a water extraction of an exemplary silicone-based composition with and without an exemplary metal oxide after gamma radiation.

A platinum catalyzed liquid silicone rubber (LSR) formulation contains an acid neutralizer of a metal oxide of calcium oxide (CaO) in a powder form, and added to the LSR formulation directly at the weight ratio at 1%. As seen in FIG. 3, the addition of CaO can bring the pH of extraction of LSR after gamma radiation from acidic to basic. The gamma radiation dose and pH is measured as discussed in Example 1.

Figure 4:
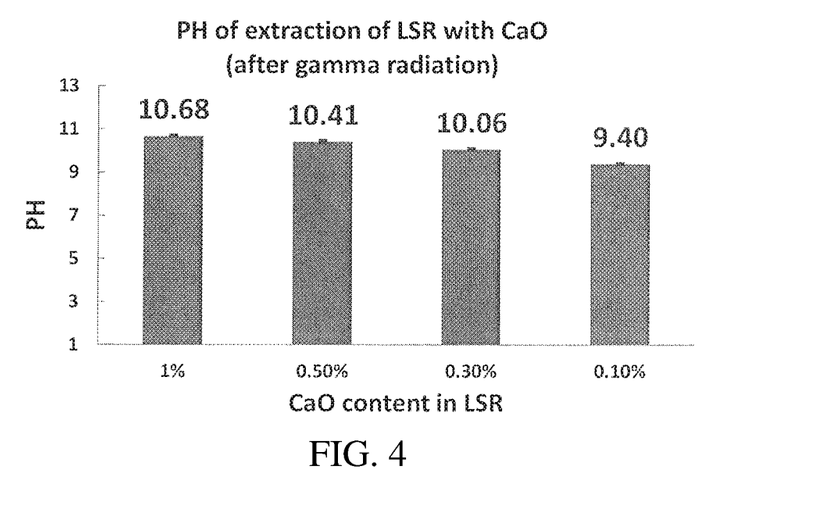
FIG. 4 is a graphical illustration of the pH of a water extraction of an exemplary silicone-based composition with varying levels of an exemplary metal oxide after gamma radiation.

In order to demonstrate the capability to control the pH of extraction by the weight ratio of CaO used in formulation, the weight ratio of CaO is varied in the same LSR formulation, from 1% to 0.1% by weight of the total silicone-based composition. As shown in FIG. 4, the pH after gamma radiation dropped from 10.68 to 9.4 with 10 times less CaO.

Example 3

Figure 5:
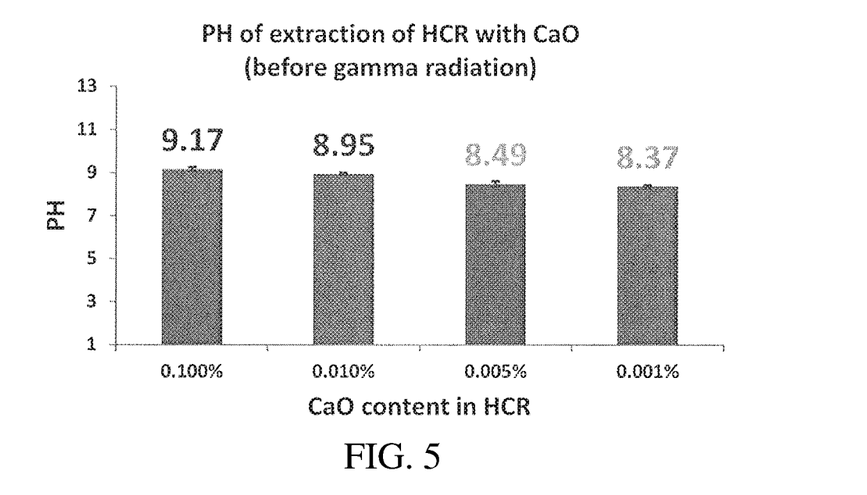
FIG. 5 is a graphical illustration of the pH of a water extraction of an exemplary silicone-based composition with varying levels of an exemplary metal oxide before gamma radiation.
Figure 6:
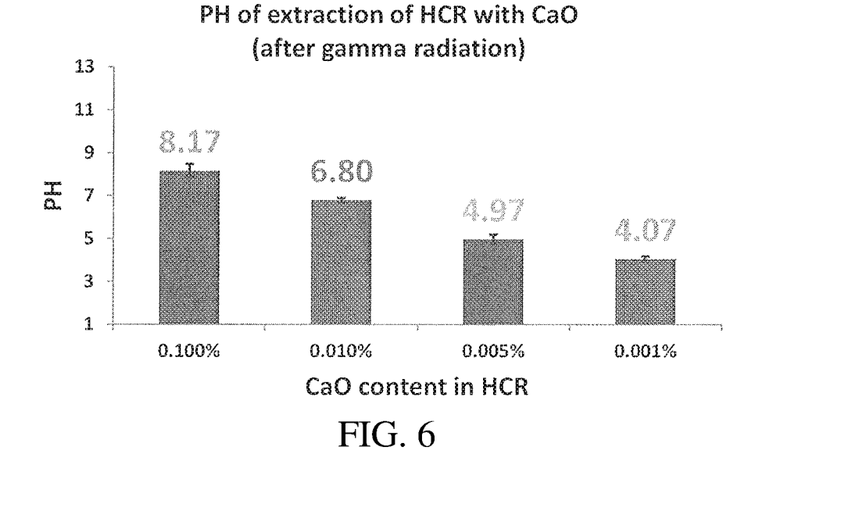
FIG. 6 is a graphical illustration of the pH of a water extraction of an exemplary silicone-based composition with varying levels of an exemplary metal oxide after gamma radiation.

A metal oxide (CaO) is added to a platinum catalyzed high consistency rubber to demonstrate that a neutralized pH of extraction can be achieved with a metal oxide in the formulation. The pH of extraction before gamma radiation is tested and the results can be seen in FIG. 5. The pH of extraction after gamma radiation can be seen in FIG. 6. The pH is measured as discussed in Example 1. As seen in FIGS. 5 and 6, the CaO decreases the pH of the gamma irradiated tube. Notably, the CaO content of 0.01% by weight of the total silicone-based composition in the high consistency rubber is particularly advantageous.

Example 4

Three different exemplary acid neutralizers are added to a platinum catalyzed high consistency rubber to demonstrate that a neutralized pH of extraction can be achieved with a low loading (100 to 1000 ppm, or 0.1 to 0.01% by weight) in the formulation. The pH of extraction after gamma radiation is tested and can be seen in Table 2. The pH is measured as discussed in Example 1. Further, the transparency of each of the silicone formulations with the basic additive does not change significantly.

TABLE 2

| Basic additive | 0.5% | 0.1% | 0.01% | 0.005% |
|---|---|---|---|---|
| CaO | — | 8.5 | 7.1 | 5.3 |
| MgO | 8.3 | 5.4 | 4.4 | — |
| Na$_2$SiO$_3$ | 9.2 | 10 | 5 | 4.1 |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A silicone-based composition comprises:
a silicone polymer and at least one acid neutralizer comprising a metal oxide, a salt of a strong base and a weak acid, a weak base, a hydroxide, an organic base, an ion exchanger, or combination thereof, the metal oxide comprising an alkaline earth metal, a transition metal, or combination thereof, wherein the silicone-based composition has a pH of at least about 5 after at least one dose of irradiation, when measured by a pH meter, wherein the dose of irradiation comprises gamma irradiation of Cobalt-60 ($^{60}$Co) at a dose of about 10 kGy to about 200 kGy.

2. The silicone-based composition of claim 1, wherein the silicone polymer comprises a polyalkylsiloxane.

3. The silicone-based composition of claim 2, wherein the polyalkylsiloxane has a viscosity prior to cure of at least about 10,000 centipoise at a shear rate of 1 l/s (sec$^{-1}$).

4. The silicone-based composition of claim 1, wherein the metal oxide comprises calcium oxide, magnesium oxide, zinc oxide, or combination thereof.

5. A silicone-based article comprises at least one layer including a silicone-based composition, the silicone-based composition comprises a silicone polymer and at least one acid neutralizer, wherein the silicone-based composition has a pH of at least about 5 after at least one dose of irradiation, when measured by a pH meter, wherein the at least one layer comprising the silicone-based composition has an inner surface that defines a central lumen of a silicone-based tube.

6. The silicone-based composition of claim 1, wherein the metal oxide is present at an amount of about 0.0001% by weight to about 1.0% by weight based on the total weight of the silicone-based composition.

7. The silicone-based composition of claim 1, wherein the silicone-based composition further comprises a filler, a fluorosilicone, a phenylsilicone, an inhibitor, or a combination thereof.

8. The silicone-based composition of claim 1, wherein the silicone-based composition has a pH of about 5 to about 10 when measured by a pH meter.

9. The silicone-based composition of claim 1, wherein the silicone-based composition is at least a portion of a tubing, a manifold, a seal, a gasket, or a stopper.

10. The silicone-based composition of claim 1, wherein the silicone-based composition is a biopharmaceutical tube.

11. The silicone-based composition of claim 1, wherein a corresponding hydroxide of the metal oxide has a pKb of not greater than about 14.

12. The silicone-based article of claim 5, wherein the acid neutralizer comprises a metal oxide, a salt of a strong base and a weak acid, a weak base, a hydroxide, an organic base, an ion exchanger, or combination thereof.

13. The silicone-based article of claim 5, wherein the inner surface is in contact with a biopharmaceutical fluid.

14. An apparatus comprising:
the silicone-based article according to claim 5, wherein the silicone-based article comprises a tube; and
a pump coupled to the tube to dispense fluid contained in the tube.

15. A medical device comprising the silicone-based article according to claim 11.

16. A method of forming a silicone-based article comprises:
providing at least one layer comprising a silicone-based composition, the silicone-based composition comprising a silicone polymer and at least one acid neutralizer comprising a metal oxide, a salt of a strong base and a weak acid, a weak base, a hydroxide, an organic base, an ion exchanger, or combination thereof, the metal oxide comprising an alkaline earth metal, a transition metal, or combination thereof, wherein the silicone-based composition further comprises a filler, a fluorosilicone, a phenylsilicone, an inhibitor, or a combination thereof;
curing the silicone-based composition; and
irradiating the silicone-based composition with a radiation source, wherein the silicone-based composition has a pH of at least about 5 after at least one dose of irradiation, when measured by a pH meter, wherein the dose of irradiation comprises gamma irradiation.

17. The method of claim 16, wherein the gamma irradiation comprises Cobalt-60 ($^{60}$Co) at a dose of about 10 kGy to about 200 kGy.

18. The method of claim 16, wherein the silicone polymer comprises a polyalkylsiloxane.

19. The method of claim 16, wherein the metal oxide comprises calcium oxide, magnesium oxide, zinc oxide, or combination thereof.

* * * * *

UNITED STATES PATENT AND TRADEMARK OFFICE
CERTIFICATE OF CORRECTION

PATENT NO. : 10,836,906 B2
APPLICATION NO. : 15/847413
DATED : November 17, 2020
INVENTOR(S) : Jianfeng Zhang et al.

It is certified that error appears in the above-identified patent and that said Letters Patent is hereby corrected as shown below:

In the Claims

Column 16, Line 37, please delete "according to claim 11.", and insert --according to claim 5.--

Signed and Sealed this
Twenty-ninth Day of November, 2022

Katherine Kelly Vidal
*Director of the United States Patent and Trademark Office*